United States Patent
Brugait et al.

(10) Patent No.: US 6,253,886 B1
(45) Date of Patent: Jul. 3, 2001

(54) SERVICE AND SPRING BRAKE CYLINDERS

(75) Inventors: Jean-Louis Brugait, Vaux en Amienos; Damien Beauvois, Rivery; Claudino Goncalves, Noyon, all of (FR)

(73) Assignee: SAB WABCO S.A., Sevran (FR)

( * ) Notice: Subject to any disclaimer, the term of this patent is extended or adjusted under 35 U.S.C. 154(b) by 0 days.

(21) Appl. No.: 09/319,825

(22) PCT Filed: Dec. 10, 1997

(86) PCT No.: PCT/FR97/02253

§ 371 Date: Sep. 13, 1999

§ 102(e) Date: Sep. 13, 1999

(87) PCT Pub. No.: WO98/26969

PCT Pub. Date: Jun. 25, 1998

(30) Foreign Application Priority Data

Dec. 17, 1996 (FR) .................................................. 96 15494

(51) Int. Cl.$^7$ ............................................ F18D 65/24
(52) U.S. Cl. ........................................................ 188/170
(58) Field of Search .............................. 88/170, 202, 203, 88/216; 303/71; 92/29, 63, 65, 130 A

(56) References Cited

U.S. PATENT DOCUMENTS

| | | | |
|---|---|---|---|
| 3,217,611 | 11/1965 | Leighton | 92/64 |
| 3,363,519 | 1/1968 | Clack | 92/130 |
| 4,478,319 | 10/1984 | Casalone et al. | 188/170 |
| 5,205,380 | * 4/1993 | Paquet | 188/18 A |

FOREIGN PATENT DOCUMENTS

| | | |
|---|---|---|
| 1 555 531 | 7/1970 | (DE) . |
| 2366967 | 5/1978 | (FR) . |
| 2 492 330 | 8/1983 | (FR) . |

\* cited by examiner

*Primary Examiner*—Christopher P. Schwartz
*Assistant Examiner*—C. T. Bartz
(74) *Attorney, Agent, or Firm*—Townsend and Townsend and Crew LLP

(57) ABSTRACT

The cylinder of the combined service and spring brake comprises a service brake piston rod capable of being connected to a brake linkage by means of a clearance adjuster. It combines the releasing pistons (26, 50) of the spring brake and service brake cylinder (2) with its piston (11) and its piston rod (12) provided with a clearance adjuster (16), and at least a dividing attachment rotating between the spring piston (26) and the ring-shaped base (37), such as a spindle (55) simultaneously passing through an axial bore (56) provided in the ring-shaped base (37) and a conjugated blind bore (57) provided in the spring piston (26). The invention is applicable to combined spring cylinders using the service brake clearance adjuster.

16 Claims, 2 Drawing Sheets

SERVICE AND SPRING BRAKE CYLINDERS

The present invention relates to a combined spring and service brake cylinder the service brake cylinder piston rod of which is adapted to be linked to a brake rigging via a slack adjuster housed at least in part in said piston rod, the free end, remote from said service brake piston, of which is adapted to be operated on by the spring brake piston rod which is linked to said spring brake piston by a linkage having a reversible thread which is locked in rotation and possibly adapted to be unlocked.

FR-A-2,492,330 discloses a pressurised fluid and spring brake cylinder comprising a service brake piston operated by fluid pressure and a spring brake piston which is kept in the released position by a release fluid pressure and which is able to transmit all or part of the spring reaction force to the service brake piston rod, downstream of a slack adjuster.

Such combined brake cylinders which operate as an adjustable fluid service brake and a non-adjustable parking or immobilizing brake, using one or more springs, has the advantage of allowing the spring brake to utilise the service brake rigging slack adjuster and the spring brake to be manually set to a released position (if it was previously in its braking position) or to an inactive position, by using a handle to act on activation locking means. In another embodiment (FR-A-2,366,967) this locking means makes it possible to automatically maintain the spring brake in an inactive position (which removes the risk of superimposing the service and spring brakes one over the other which in general leads to wheel lock and skidding) and to only activate it when proceeding to a release of the spring brake, intended to return the spring brake to its position where it is ready to operate, which for example is achieved by using the service brake braking pressure, this in order to avoid an unintentional initiation of a spring brake application without the driver being aware of it, notably in railroad braking.

One disadvantage of such combined brake cylinders clearly resides in their mechanical complexity and, consequently, in their cost. These two negative consequences are further aggravated by the fact that, for a given service brake bore diameter, springs having differing reaction forces are necessarily, as a function of the parking or immobilizing braking forces required, depending on whether the parking brake is for example applied to one or several brake discs on an axle and on whether, for an immobilizing brake, wheel-to-rail adhesion at a standstill that is higher than the maximum adhesion employed for braking is accepted practise or not.

The spring system of spring brake cylinders is in general constituted, for reasons of compactness and cost, by one single helical spring having several turns which are designed to come almost into touching contact when the spring brake is fully released. As a result of this single spring embodiment, when it is desired to modify the elastic reaction forces significantly, it is generally required, not only to modify the spring packing washers, but also to modify the diameter of the cylindrical wire of the helical springs, which considerably increases the cost of obtaining a different embodiment of spring brake cylinders.

Moreover, in the case mentioned above where the braking pressure and/or a pressure which is a function of the braking pressure (for example, the general brake operating pressure via a pressure reduction system) is used for ensuring release of the spring brake, preventing the forces of the service brake and immobilizing brake from being superimposed, the pneumatic brake releasing cross-section must frequently be increased compared to the cross-section of the service brake, which complicates the provision of a combined brake cylinder of the "spring+service" type.

There is thus a need to diversify and increase power of the spring and spring brake piston portion of a spring brake of this type, employed notably for railroad braking using compressed air which are usually produced in relatively small manufacturing runs and frequently in numbers of less than a hundred.

To achieve this, according to the invention, the brake cylinder comprises:

a service brake cylinder, a service brake piston mounted in the service brake cylinder and integral with a service brake piston rod, a spring brake cylinder mounted coaxially on the service brake cylinder, a spring brake annular piston mounted in the said spring brake cylinder and on said service brake piston rod, for transmitting a spring brake braking force to the latter, a plurality of springs arranged around said service brake piston, between said spring brake piston and an abutment surface integral with the assembly formed from said service brake cylinder and said spring brake cylinder assembled coaxially.

A slack adjustment member is fitted between said service brake piston rod and a brake rigging head. The spring brake piston is axially linked to said service brake piston rod via a linkage having a reversible thread able to be locked or unlocked in rotation. The abutment surface for springs is provided on an annular base interposed by means of its periphery, and keyed to prevent rotation, between the said service brake cylinder and said spring brake cylinder.

According to another embodiment, the springs are helical springs which bear axially, each one of said springs of said plurality is arranged at at least one end in a cavity of a generally cylindrical shape, for example formed in the said spring brake piston or around a central abutment.

The cavities formed in the spring brake piston are concentrically distributed with respect to the spring brake piston axis, and equally distributed on a circle of the periphery of the said spring brake piston. At least a part of the plurality of helical springs is constituted by a main helical spring inside the internal cylindrical space of which a supplementary helical spring is housed.

The spring brake piston contains a number N of cavities, and a number P of springs, with $P \leq N$, are then mounted, each one in a cavity of the spring brake piston between the base of the said cavity and said abutment surface, in an arrangement such that the resultant of the axial forces in the springs is substantially directed along the axis of the service brake piston rod.

For a given diameter of the spring brake and service brake piston, the combined cylinder can thus be constituted by a modular axial assembly of:

a service brake cylinder with its piston and piston rod fitted with the slack adjuster;

an annular abutment base, at one side, springs for of the spring brake cylinder and, at the other side, a service brake piston recall spring, the service brake piston rod passing through this annular base;

a spring brake cylinder, through the base of which the service brake piston rod passes surrounded by the spring brake piston rod, this spring brake cylinder comprising, in a bore, a standard spring brake piston which is annularly sealed as regards the spring brake release fluid acting on one side of said spring brake piston, and which is provided at the other side thereof, in the annular space available between the two annular sealing zones, with an even number of cavities, of generally cylindrical shape, for receiving at least one end portion of a helical spring or concentric helical springs, these cavities having substantially the same shape and same size, being evenly and concentrically distributed with respect to the axis of the spring brake piston;

an even number of main helical springs, of an outside diameter slightly less than the diameter of the cylindrically-shaped cavities, this even number being equal to or less than the number of cavities, each one of said helical springs being interposed, by means of its generally annular flat ends, between the base of one of said cavities, and a corresponding abutment location provided on said annular base and delimited by at least one lateral abutment;

at least one keying means for to prevent rotation, between said spring brake piston and annular base, such as a pin that simultaneously passes through an axial bore provided in the annular base, and a mating blind hole provided in the spring brake piston, for rotationally keying the cavities of the spring brake piston with respect to the corresponding abutment locations of the annular base; so that, with all the other remaining components remaining identical, the reaction forces of the springs on the spring brake piston can be modified, simply by modifying the even number of main helical springs interposed between the bottom of the cavity and the location on the annular base.

The use of springs that are practically standard in railroad spring brakes and the fact of obtaining a range of spring forces, by varying the even number of springs, makes it possible to obtain a whole series of advantages. Firstly, the maximum possible reaction force for the spring brake is increased as it is possible to house distinctly more spring steel in the annular space available for the springs than would be the case if one were to use a single helical spring.

It will also be noticed that an even number of main helical springs can be fitted with a supplementary helical spring housed inside the main helical spring, and inserted between the bottom of the corresponding cavity and the corresponding abutment location provided on the annular base, so as to provide supplementary modification of the total reaction force of the springs on the spring brake piston along with a variation of this reaction force as a function of spring brake piston travel. The inner space is in effect completely free for housing a supplementary helical spring, having a higher elasticity than the main spring, thus having a lower reaction force, but of which the reaction force falls off less quickly as a function of the brake release curve. There is obviously nothing against (except a trade-off between effectiveness and complexity and cost of assembly) mounting a third helical spring inside a supplementary helical spring.

Among the advantages obtained through the structure using several main helical springs regularly spaced, one can note the elimination of a twisting force exercised on the spring brake piston during release or compression of the spring, such removal facilitating angular keying of the spring brake piston. One of the most striking advantages appears however to reside in the fact that it is now possible to provide for particularly precise and accurate calibration of the standard helical spring manufactured in much larger numbers. The springs thus calibrated can now have all practically the same length in their unloaded state and provide, in their compressed state, the same reaction force within a tightly-limited range of variations. It is no longer necessary to provide adjustment washers for varying rating, between the spring and its support on the spring brake piston and/or on the annular abutment base. The overall balance for the cost of supply and mounting appears clearly favourable, and several standard helical springs (up to ten per cylinder in the example proposed) are less expensive than the one large size helical spring which must be coiled at high temperature and hardened with very great care. A further advantage could reside in the fact that several springs manufactured in series and carefully controlled stand less chance of breaking than one single spring, for the same spring force. Additionally, should one of the series of springs distributed over the piston break, the immobilizing force of the spring brake will not completely disappear as was the case with the single spring.

According to a further embodiment of the invention, for a sealing diameter of the pistons distinctly greater than the diameter of the standard spring brake piston, the service brake cylinder, annular base, spring brake cylinder and the piston thereof, are adapted to the distinctly greater sealing diameter, but the spring brake piston is provided with an even number of standard cylindrical cavities, their number being greater than the even number of cavities provided in the standard spring brake piston, the corresponding abutment locations being provided on the annular base, and main helical springs and, optionally, supplementary standard helical springs are interposed in any number, each one between the base of a cavity and the corresponding abutment location on the annular base.

According to yet a further embodiment of the invention, in the released position of the spring brake, the spring brake piston is screwed onto the reversible thread of the spring brake piston rod, at least in part in the axial region comprised between the service brake piston and the abutment locations of the helical springs on the annular abutment base, so as to improve centring of the resultant reaction forces on the spring brake piston rod.

According to one advantageous embodiment of the invention, the standard spring brake piston carries ten cylindrical cavities for receiving springs, and the annular base has ten corresponding abutment locations delimited by at least one lateral abutment, and the helical springs are arranged in a number of ten or five standard helical springs evenly distributed, or in a number of two, four, six or eight helical standard helical springs, symmetrically distributed with respect to a plane that passes through the axis or center of the piston, and in fact, symmetrically with respect to two orthogonal planes.

The combined brake cylinder according to the invention can comprise a supplementary spring brake release cylinder fitted with an additional annular brake-release piston the brake release piston rod of which is movably housed, and in a sealed manner, in the form of an annular sleeve, between the base of said spring brake cylinder and said spring brake piston rod, in order to come into annular abutment with the annular main spring brake piston under the effect of a brake release pressure acting on said supplementary brake-release piston. The supplementary brake-release cylinder can carry at the periphery thereof, threaded axial assembly holes, while said spring brake cylinder and said service brake cylinder have at their periphery, axial through holes corresponding to said axial threaded assembly holes and in each one of which an axial assembly screw for said three cylinders is mounted, screwed into one of said threaded assembly holes and abutting on the periphery, at the external side, of said axial through hole in the service brake cylinder.

The method according to the invention for adjusting the reaction force of the springs of a brake cylinder employs a standard spring brake piston provided with a standard number N of substantially cylindrical cavities for receiving one or more springs, and within the said P cavities, with P≦N, a standard helical spring is arranged compressed between the bottom of said cavity and an abutment surface integral with the brake cylinder assembly, said helical springs being arranged whereby the resultant of the reaction forces of these springs passes substantially along the axis of said service brake piston rod, the number P of springs being selected so as to provide a reaction force which is closest to the desired reaction force in service.

The adjustment method uses, for at least a part of said springs, a main helical spring within the inner cylindrical space of which a supplementary helical spring is housed or, alternatively, for pairs of springs arranged symmetrically with respect to the axis of the spring brake piston, two standard springs having however different reaction forces from one pair of springs arranged symmetrically to another pair of springs arranged symmetrically, for a given compression travel, in order to further increase the range of reaction forces available for the spring brake.

Other aims, advantages and characteristics will become more clear from the description that follows of several embodiments of the invention provided by way of non-limiting example and with reference to the attached drawings in which.

Figure 1:
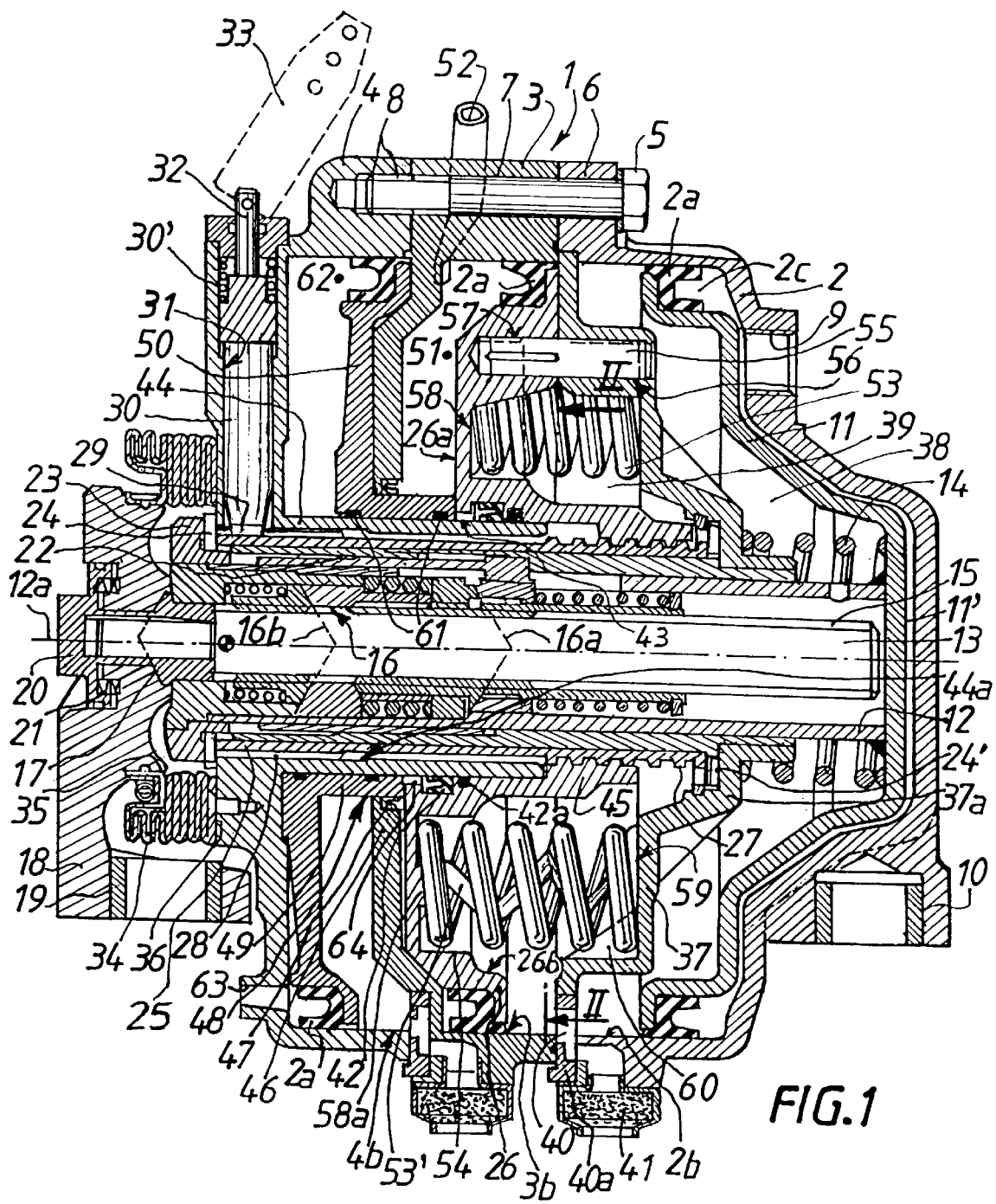
FIG. 1 is a longitudinal cross-sectional view taken along the cylinder axis of a service and spring brake cylinder according to the invention, the upper and lower halves of the drawing being taken on different sectional planes, in order to bring out certain details.

With reference to FIG. 1, it can be seen that the service and spring brake cylinder 1, intended for railroad braking, is constituted by a stack of several cylinders assembled coaxially, these being respectively a service brake cylinder having main springs 3, and auxiliary springs 4, which cylinders here are each provided in the form of a single one-piece casting in the general shape of a cup with a closed bottom (service brake cylinder 2) or open in the centre. Each one of the cylinders here has a bore 2b, 3b, 4b of the same diameter, for receiving a piston, and the outer lipped pneumatic seals of the pistons are advantageously identical, for reasons of standardizing supply.

As can be seen in the top half of the sectional view in FIG. 1, the three cylinders are assembled axially by a ring of screws 5, each of which passes through an axial through hole or bore 6 provided in the peripheral portion of service cylinder 2, an axial through bore 7 provided in the periphery of the main spring cylinder 3, and which are screwed into a threaded hole 8 provided in the peripheral portion of auxiliary spring cylinder 4. Screws 5 thus provide for axial assembly with these three cylinders 2, 3, 4 clamped between the screw heads bearing on the periphery of bores 6 and threaded bores 8.

Service brake cylinder 2, the body of which has, respectively, a threaded connector 9 for compressed air feed and compressed air discharge together with two sleeved bores 10 (only one of which can be seen in the bottom half of the drawing) for providing a connection to brake rigging (for example to disc brake calliper operating levers), comprises a service piston 11, having a central projection 11' with a shape matching that of the inner wall of cylinder 2. Central projection 11' makes it possible to advance service piston rod 12 right up to the sleeved bores 10 so that it can house a slack adjusting screw 13 of greater length, by offsetting service brake piston recall spring 14 with respect to the reversible thread of the spring brake piston rod.

Screw 13 for taking up slack, mounted coaxially with piston rod 12 with axis 12a, carries, at its periphery, a reversible thread 15 onto which there is screwed, in a known fashion, a slack adjuster generally identified by reference numeral 16, and which will not be described in detail here. Slack adjuster 16 is in fact interposed mechanically between service brake piston rod 12 and the screw 13 for taking up slack with the reversible thread, which itself rigidly bears, via a manually-releasable claw coupling 17, on a brake rigging head 18 (hammer head) having two sleeved bores 19 (only one of which can be seen in the lower half-view of FIG. 1) for providing a connection to a brake rigging. A manual adjustment head 20, which is urged back into the blocking position of claw coupling 17 by an axial spring using spring washers 21 makes it possible, by introducing a hollow hexagonal key over head 20 and by exercising force on the head 20 against claw coupling 17, to unlock the latter and to manually turn screw 13 for taking up slack, in order to proceed with manual adjustment of slack, for example before or after changing a brake lining or pad.

Service brake piston rod 12 is linked, in a factory-adjustable manner using thread 22, to an abutment crown 23, via the intermediary of needle bearing or the like abutment means 24, a spring brake piston rod 25 linked to spring brake piston 26 via a reversible thread 27, for example a thread having a trapezium-shaped cross section, as shown. At the end carrying needle-bearing abutment means 24, away from reversible thread 27, axial ribs 28 are provided which, in cross section, have a steep edge on one side and a gentle slope on the other side. These ribs 28 co-operate with the steep-edged tooth 29 of a ratchet means 30 which is urged by a recall spring 30' in a guide bore 31, into contact with the ribs 28. Even in the presence of a significant tangential thrust exercised by a rib 28 on tooth 29, it is still possible to manually withdraw ratchet means 30 against the force of spring 30', by exercising a lever effect on a central pull rod 32, using a swinging lever 33, as shown in dashed lines on FIG. 1. In certain applications, pull rod 32 can be linked to a pneumatic or hydraulic piston for operating ratchet 30, for example in the manner shown in French patent 2,366,967.

In FIG. 1, screw or threaded rod 13 for taking up slack is shown in a position where it is completely withdrawn inside service brake piston rod 12, but when there is an increase in play in the brake rigging, notably as a result of the progressive wear of brake linings and friction tracks, the screw or threaded rod 13 will move outwardly, in other words to the left in FIG. 1, with respect to the slack adjuster 16 having the reversible thread, through a succession of unlocking and advance operations at the lines 16a and 16b where locking occurs. To ensure that spring system 24, 25, 27, 29, 30 and all the slack adjustment elements 13, 16 are sealed against ingress of water and dust and dirt, an elastic corrugated boot or bellows in an elastomer material 34 is interposed between an internal crown 35 having a sealing groove of brake rigging head 18, and a front sealing face 36, provided externally on auxiliary spring brake cylinder 4, surrounding the point where spring brake piston rod 25 exits, the corrugated boot 34 being retained firmly in position by a clamping ring on crown 35, and by a ring of screws on front face 36. When screw 13 for taking up slack has moved to its maximum external position, the corrugations of boot 34 will have unfolded in order to continue to ensure the assembly comprising the slack adjuster and rotational and ratchet linkage system between service brake piston rod 12 and spring brake piston 26 is kept properly sealed.

Service brake cylinder 2 and the main spring brake cylinder 3 are separated by an annular partition or base 37 providing an abutment for the springs. Base 37 is, for example, kept clamped axially and locked against rotation between the two bodies of cylinders 2 and 3, and separates a breathing chamber for service brake cylinder 38 from a breathing chamber 39 for the spring brake cylinder. The two breathing chambers 38, 39 are connected together by a lateral passage 40 (provided in a part 40a for keying annular base 37 to prevent rotation with respect to service brake cylinder 2), and to the atmosphere via a filter 41. The rod 12 of the service brake piston passes through annular base 37 having a central portion 37a which projects in the same direction as central projecting portion 11' of service brake piston 11. Inside breathing chamber 38, the service brake piston recall spring 14 bears against the central portion 37a, while, inside breathing chamber 39, needle-bearing abutment means 24' are interposed between spring brake piston rod 25 and this projecting portion 37a.

Spring brake piston 26, which here performs the function of the main spring brake piston, is housed in a sealed fashion and able to move axially within inner bore 3a, with which it co-operates via an annular lipped seal 3a. Inner sealing of spring brake piston 26 is here provided by a lipped seal 4 assisted by an O-ring seal 42a which move in a sealed fashion in contact with the outer cylindrical surface of a sleeve 44 integral with spring brake auxiliary cylinder 4, an inner bore of which guides spring brake piston rod 25 in the region where the axial ribs 28 are provided.

The main spring brake piston 26 has, beyond the inner seals 42 and 42a, a central axial annular extension 45 provided with an inner reversible thread that co-operates with the outer reversible thread 27 of spring brake piston rod 25. The main spring brake cylinder 3 houses an inner partition 46, forming a cylinder base and provided, in the region of a central passage, with an annular lipped seal 47 which co-operates with the outer cylindrical surface 48 of a sleeve 49 integral with the supplementary piston 50 for releasing the spring brake. Between the inner partition 46 and spring brake piston 26, a main chamber 51 for releasing the spring brake is defined, and which is connected, through a connector 52, to a source of compressed air for releasing the spring brake, acting on the face 26a of the spring brake piston, against a series of springs 53, bearing on the other face 26b of the spring brake piston.

The springs 53 which, in the embodiment proposed can be ten in number, are identified by the reference numerals 53a, 53b, . . . 53i, 53j and are evenly distributed (as in FIGS. 2a and 2d), or are symmetrically distributed with respect to a plane passing through the centre or axis of the piston. For this, the main spring brake piston 26 includes, at its face 26b, an even number of cavities 54, and in the preferred embodiment, ten cavities 54, of a generally cylindrical shape, and adapted to house an end portion of helical springs 53, which can each internally include an additional helical spring (see inner spring 53' on the lower half of FIG. 1) having an outside diameter less than the inside diameter of helical springs 53 and, optionally, an opposite pitch and a different unloaded length to that of springs 53. The cavities 54 are substantially all of the same size as regards their diameter and length (slight differences can exist as a result of the presence of bores for keying against rotation), the cavities being evenly and concentrically distributed on the axis of the spring brake piston, in the space available between extension 45 and the housing for the outer lipped seal 2a.

The main spring brake cylinder 26 is keyed to prevent rotation with respect to separating partition 37 and consequently with respect to the assembled body of the combined brake cylinder 1, by means of at least one pin 55 which passes through an axial bore 56 provided in the annular base 37, to be housed in a blind hole 57 provided in the main spring brake piston 26. Keying against rotation, which is preferably achieved by means of several pins 55 while only one such pin has been shown, is necessary even when the helical springs 55 exercise no turning moment on piston 26, as the reversible thread 27 of spring brake piston rod 25 which is locked against rotation by tooth 29 of ratchet 30, exercises a significant reaction turning moment on the thread of sleeve 45.

Each one of the main helical springs 53 is fitted between the base 58 of a cavity 54 and a corresponding abutment location 59, provided on the annular base 37, and delimited by at least one lateral abutment 60, each spring thus being automatically distributed evenly and concentrically with respect to the axis of spring brake piston 26. The supplementary helical springs 53', housed inside the main helical springs 53, can be mounted freely inside the main helical springs but, preferably, central abutments of limited height 58a are provided on the base 58 of the cavities 54 and, respectively, on the abutment locations 59, in order to avoid any contact between the supplementary helical spring 53' and the main helical spring 53 surrounding it. It will be noted that solutions with a spring brake cylinder employing one single helical spring do not generally allow a supplementary helical spring to be housed inside the main spring.

The auxiliary spring brake cylinder 4, which acts as a supplementary cylinder for releasing the spring brake, carries, inside bore 31, the ratchet 34 for manually releasing the spring brake, and guides, in a sealed manner, the supplementary brake release piston 50 inside bore 4b. Piston 50 is also guided in a sealed manner on the outer cylindrical surface of sleeve 44, using two sealing means employing O-ring seals 61 (or having a square or rectangular cross-section). Between the supplementary brake release piston 50 and the front wall of supplementary cylinder 4, a supplementary brake release chamber 62 is thus defined of an annular shape and having the same cross section as the main brake release chamber 51, and which is linked to a source of brake-release compressed air by a connector 63. Obviously, it is possible not to use the supplementary brake release cylinder; in this case, the main spring brake cylinder 3 as shown is deleted along with the supplementary brake release piston 50, and the supplementary cylinder 4 is used in the place of the main cylinder 3, the length of sleeve 44 being suitably reduced. Such simplification is possible on each occasion when the pressure available in the main brake release chamber 51 is sufficient to bring about complete compression of the springs 53, 53', as shown in the top half of FIG. 1.

As can be seen on FIGS. 2a to 2d, the solution according to the invention with one main piston 26 having several springs distributed concentrically or symmetrically, makes possible a great variety of combinations.

Figure 2A:
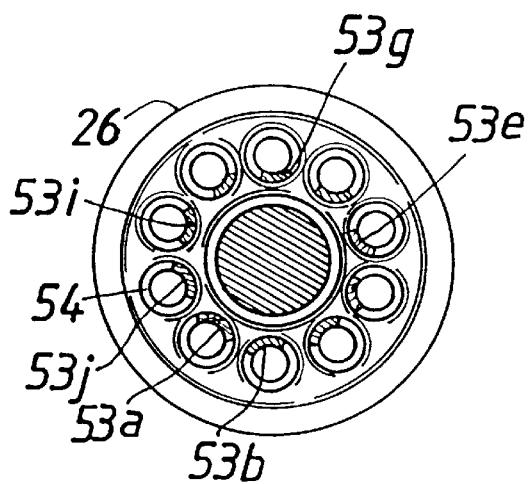
FIGS. 2a to 2d are partially diagrammatical front views, on a reduced scale, taken along line II—II of FIG. 1, of the spring brake piston of the brake cylinder shown in FIG. 1, with respective configurations employing 10, 8, 6 and 5 springs, distributed over a peripheral circumference of the spring brake piston.
Figure 2B:
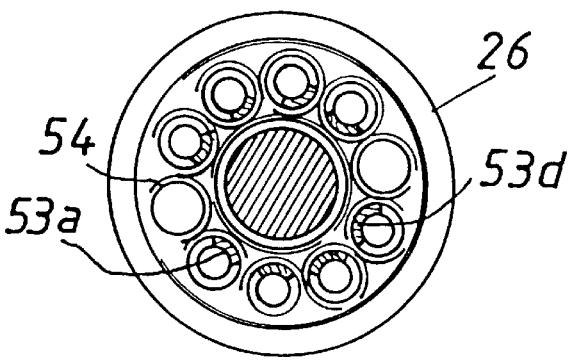

In the arrangement shown in FIG. 2a, all ten cavities 54 are provided with a helical spring 53, and the maximum reaction force for the brake spring is obtained. In the arrangement in FIG. 2b, the springs 53 in two opposite cavities 54 are removed and an arrangement with eight springs, which are symmetrical with respect to a to plane passing through the centre of piston 26, is obtained. In the arrangement in FIG. 2c, six springs 53 are arranged symmetrically with respect to a plane passing through the centre of the cylinder. By reversing the arrangement, in other words removing the six springs and inserting four springs in the cavities 54 which is shown empty in FIG. 2c, an arrangement with only four springs is obtained, having good symmetry with respect to a plane passing through the axis of cylinder 26. On FIG. 2d, the solution using five springs 53 which are thus evenly distributed with one cavity 54 being empty followed by a cavity 54 fitted with a spring 53 is shown. One could also only insert two diametrically-opposed springs. By a simple choice at the time of assembly, one thus can dispose of a spring brake the power of which ranges from two to ten springs (2, 4, 5, 6, 8, 10) and of which the brake release force can be modulated using one single release piston, or two pistons 26, 50. Also, in order to modulate the power of the springs, some of the pairs of symmetrical springs can be provided with a supplementary inner spring 53'.

Figure 2C:
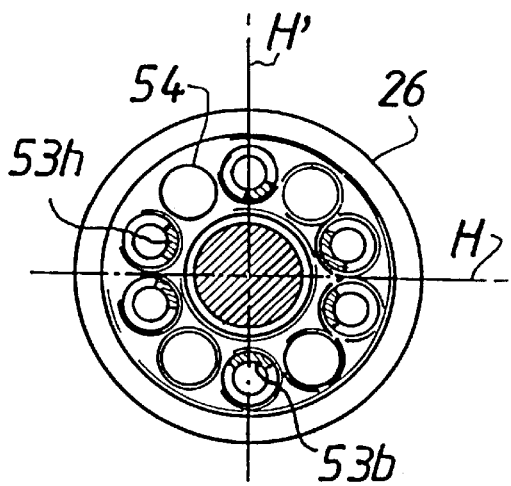
Figure 2D:
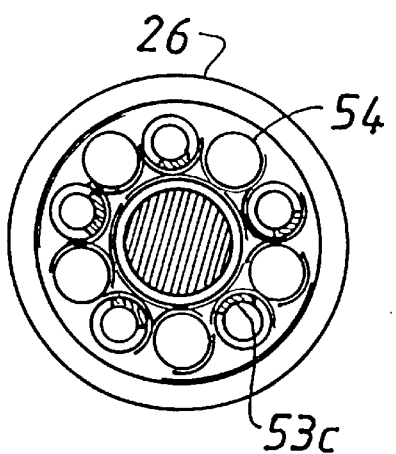

In a more general arrangement, it will be noted that in order to ensure that the resultant reaction force of the helical springs 53 passes substantially through the axis 12a of piston rod 12, it is sufficient for the springs to be arranged symmetrically with respect to two orthogonal planes (marked H and H' on FIG. 2c). Solutions using six, twelve or fifteen cavities 54 are also possible which make it possible to have a large number of spring combinations 53, arranged in an even or odd number, in a highly progressive sequence. 12 cavities thus make it possible to provide combinations of 2, 4, 6, 8, 10 and 12 springs and 15 cavities allow combinations of 3, 5, 6, 9, 10, 12, 15 springs. Helical springs, even if they are identical and carefully rated, always have a slight difference in reaction force when they are under considerable compression and the resulting reaction force will never pass exactly along axis 12a of piston rod 12, but a slight offset of the resultant reaction force will have no effect on the spring brake cylinder which can also accommodate slight offsets in concentricity, and regularity, of the distribution of the cavities 54, as can happen with parts which are directly cast from the foundry.

The combined brake cylinder according to the invention operates as follows. In the normal running condition of the vehicle fitted with the combined cylinder according to the invention, the connectors 52 and 63 are connected to a source of brake-release compressed air, for example compressed air from the general braking line of a railroad vehicle, such as a train, and connector 9 is connected to the braking valve of the vehicle.

Under the effect of the brake-release pressure inside chambers 51 and 62, the spring brake piston 26 is urged to the right in FIG. 1 by the pressure prevailing in main chamber 51 and by the thrust of supplementary piston 50, transmitted by sleeve 49 which is in annular abutment on an inner flange 64 of spring brake piston 26. Spring brake piston 26 and supplementary piston 50 thus occupy an abutment position, with the brakes fully released, shown in the top half of FIG. 1.

When a service brake application is initiated, service brake chamber 2c is supplied with compressed air via connector 9, and service brake piston 11 moves to the left in FIG. 1 along with piston rod 12, which locks and moves slack adjuster 16 and the screw 13 for taking up slack, this moving the brake rigging head (hammer head) 18 to the left in FIG. 1, which causes the brakes to operate through relative movement of the sleeved bores 10 and 19, which are connected to brake-operating levers.

When the pressure in service brake chamber 2c falls, service brake piston 11 returns to the brake-release position as shown in FIG. 1. As a result of successive operations of the service brakes, screw 13 for taking up slack will shift with respect to slack adjuster 16 to the left in FIG. 1, without turning as it is locked in rotation with respect to break rigging rod 18 by the claw coupling 17. The brake rigging head 18 thus progressively moves to the left, while still remaining linked (in a manner providing sealing against entry of dust and dirt) to supplementary cylinder 4, thanks to the elastic corrugated boot 34.

Abutment crown 23 however remains rigidly connected to service brake piston rod 12, and the needle-bearing abutment means 24 bears against this crown 23. If the spring brake is applied by venting air from connectors 52 and 63, for example to achieve long-term immobilization of the vehicle, the spring brake piston 26, urged by the springs 53 and 53', will exercise a tractional force on the sleeve 45 which is screwed onto thread 27 of the spring brake piston rod 25 which is locked in rotation by ratchet 30. Piston rod 25 consequently moves to the left in FIG. 1, and the ribs slide while engaging ratchet 30. The needle bearing abutment means 24 on which spring piston rod 25 bears, moves the abutment crown 23 and the service brake piston rod 12 which is integral therewith, to the left in FIG. 1. Piston rod 12, in its turn, moves the brake rigging head 18 to the left in FIG. 1 via the slack adjuster 16, thereby bringing about a brake application. As can be seen, the spring brake uses the adjustment of slack adjuster 16, making it possible to have the brakes operate with short strokes of the spring. Normally, the spring brake piston 26 is immobilized in the brake-operating position before coming into abutment, either with the face of the inner partition 46, or, indirectly, by abutment of supplementary piston 50 on the base of auxiliary cylinder 4, in the position shown in the lower half of FIG. 1. The release of the spring brake can be achieved by putting the spring brake release chambers 51 and 62 under pressure, which will bring the elements of the combined cylinder into the position shown in the top half of FIG. 1.

If compressed air for brake release is not available, and if it is nevertheless necessary to release the spring brake, it is possible, by exercising a tractional force having a pivoting effect on lever 33, to apply significant tractional force to ratchet 30, against the action of recall spring 30' and frictional forces between tooth 29 and rib 28, thereby releasing the spring brake piston rod 25, allowing it to rotate with a low degree of friction, thanks to the presence of the abutment means provided with needle bearings or the like 24 and 24'. Under the effect of the thrust exercised by the springs 53 in a leftward direction in FIG. 1, the spring brake piston 26 moves to the left causing piston rod 25 to turn, with the outer reversible thread thereof 27 becoming unscrewed with respect to the thread of sleeve 45. It will be recalled that spring brake piston 26 is locked to prevent rotation by keying means (pin 55 housed in bores 56 and 57). The spring brake pistons 26 and 50 now come to adopt the position shown in the lower half of FIG. 1, while, under the effect of the reaction force of the brake rigging, abutment crown 23, linked to service brake piston rod 12 which, in its turn is linked by the slack adjuster 16 to the screw 13 for taking up slack and to the brake rigging head 18, urges spring brake piston rod 25 to the right, thereby unscrewing the reversible thread 27 inside sleeve 45 which is prevented from rotating by the keying means 55, 56, 57 and is axially immobilized by the spring brake pistons 26, 50 being in abutment thanks to the thrust exercised by springs 53.

We have consequently returned to the position where the brakes are released, as shown in the lower half of FIG. 1.

After manually releasing the spring brake, if the chambers 51 and 62 are again pressurised to release the brakes, the spring brake piston 26 will move to the right causing piston rod 25 to rotate in the opposite sense, in other words in the sense for which the ratchet 30 is not operative to block rotation of the ratchet means constituted by the axial ribs 28, this continuing until the abutment position shown in the top half of FIG. 1 is achieved.

In a further embodiment which, in principle, prevents superimposition of the spring brake and service brake, the central pull rod 32 is linked, as indicated previously, to a release piston able to be operated to perform release by fluid pressure constituted, for example, by the pressure in the general braking line of the train. Under the action of springs 53, the main spring brake and supplementary spring brake pistons 26 and 50 cause spring brake piston rod 25 to turn, it not being locked any longer, and are consequently urged to the left in FIG. 1, into the abutment position shown in the lower half of FIG. 1. Service braking operates normally as indicated previously, abutment crown 23 and the needle-bearing abutment means 24 separating, at each operation of the service brake, from the end of spring brake piston rod 25. In the case of a parking or immobilization braking, the service brake firstly operates the service brake piston 11. Following this, and as a result of immobilization or parking, the brake release piston releases pull rod 32 which brings the ratchet 30 into the brake release position shown in the top half of FIG. 1. At the same time, spring brake release chambers 51 and 62 are supplied with a brake release pressure which is a function of the braking pressure or equal to the braking pressure prevailing in service brake chamber 2c. The spring brake is thus in a position ready to operate and will only operate if the service braking pressure drops or disappears, the overall effect of the service brake and spring brake remaining substantially constant during progressive release of the service brake due, for example, to leakage from the seal 2a of the service brake. In this embodiment of the method of operation, the spring brake will thus automatically and progressively take the place of the service brake, should the latter fail.

Obviously, the present invention is not limited to the embodiments which have been described and illustrated, but may be subject to numerous modifications available to those skilled in the art without however departing from the scope of the invention.

What is claimed is:

1. A brake cylinder comprising:

a service brake cylinder;

a service brake piston mounted in the service brake cylinder and integral with a service brake piston rod;

a spring brake cylinder mounted coaxially on the service brake cylinder;

a spring brake piston mounted in said spring brake cylinder and on said service brake piston rod, for transmitting a spring brake braking force to the latter; and a plurality of springs arranged around said service brake piston rod, between said spring brake piston and an abutment surface integral with an assembly formed from said service brake cylinder and said spring brake cylinder assembled coaxially, the assembly further comprising a supplementary spring brake release cylinder fitted with an additional annular spring brake-release piston having a brake release piston rod that is movably housed, and in a sealed manner, in the form of an annular sleeve, between an end of said spring brake cylinder and said spring brake piston rod, the spring brake release piston rod being configured to come into annular abutment with the spring brake piston when a brake release pressure is applied to said annular brake-release piston.

2. The brake cylinder according to claim 1, characterized in that said supplementary spring brake-release cylinder carries; at a spring brake release cylinder periphery thereof, threaded assembly holes; said spring brake cylinder includes, at a spring brake cylinder periphery thereof, axial spring brake cylinder through holes; and said service brake cylinder includes, at a service brake cylinder periphery thereof, axial service brake cylinder through holes, said axial spring brake cylinder through holes and said axial service brake cylinder through holes corresponding to said threaded assembly holes and in each one of which an axial assembly screw for said spring brake cylinder, said service break cylinder, and said supplementary spring brake release cylinder is mounted, screwed into one of said threaded assembly holes and abutting on the service break cylinder periphery.

3. The brake cylinder according to claim 1, characterized in that a slack adjustment member is fitted between said service brake piston rod and a screw mounted coaxially with said service brake piston rod and bearing on a brake rigging head.

4. The brake cylinder according to claim 1, characterized in that said spring brake piston is axially linked to said service brake piston rod via a linkage having a reversible thread able to be locked or unlocked in rotation.

5. The brake cylinder according to claim 1, characterized in that said abutment surface for springs is provided on an annular base interposed by means of its periphery, and keyed to prevent rotation, between the said service brake cylinder and said spring brake cylinder.

6. The brake cylinder according to claim 5, characterized in that keying means for preventing rotation are interposed between said spring brake piston and said annular base.

7. The brake cylinder according to claim 1, characterized in that each one of the springs is arranged at at least one end in one of a plurality of cavities of a generally cylindrical shape.

8. The brake cylinder according to claim 7, wherein each of the plurality of cavities is formed in said spring brake piston.

9. The brake cylinder according to claim 6, characterized in that at least part of said plurality of springs is constituted by a main helical spring that defines an inner cylindrical space in which a supplementary helical spring is housed.

10. The brake cylinder according to claim 7, characterized in that said spring brake piston contains a number N of cavities and in that a number P of springs; where $P \leq N$, are each mounted in one of such cavities of said spring brake piston between a bottom of said cavity and said abutment surface, in an arrangement such that a resultant of axial forces of said springs passes substantially along an axis of said service brake piston rod.

11. The brake cylinder according to claim 1, characterized in that said spring brake piston includes ten cavities in which are mounted respectively, two, or four, or six, or eight helical springs arranged symmetrically with respect to two orthogonal planes.

12. The brake cylinder according to claim 4, characterized in that the spring brake piston is screwed on the reversible thread, at least in part in an axial region comprised between the service brake piston and the abutment surface.

13. The brake cylinder according to claim 6, wherein said keying means comprises a pin that simultaneously passes through an axial annular base bore provided in said annular base and a matching blind hole provided in said spring brake piston.

14. The brake cylinder according to claim 8, characterized in that the cavities provided in said spring brake piston are arranged concentrically with respect to an axis of said spring brake piston and are equally distributed on a circle of the periphery of said spring brake piston.

15. The brake cylinder according to claim 7, wherein each of the plurality of cavities is formed in a base that surrounds an abutment.

16. The brake cylinder according to claim 1, characterized in that said spring brake piston includes ten cavities in which are mounted five helical springs arranged regularly in alternate cavities.

* * * * *